(12) United States Patent
Wedemeyer et al.

(10) Patent No.: US 10,254,742 B2
(45) Date of Patent: Apr. 9, 2019

(54) ELECTRIC DRIVE SYSTEM

(71) Applicant: Lenze Automation GmbH, Aerzen (DE)

(72) Inventors: Torsten Wedemeyer, Porta Westfalica (DE); Elmar Hartmann, Aerzen (DE)

(73) Assignee: Lenze Automation GmbH, Aerzen (DE)

( * ) Notice: Subject to any disclaimer, the term of this patent is extended or adjusted under 35 U.S.C. 154(b) by 0 days.

(21) Appl. No.: 15/780,832

(22) PCT Filed: Dec. 1, 2016

(86) PCT No.: PCT/EP2016/079499
§ 371 (c)(1),
(2) Date: Jun. 1, 2018

(87) PCT Pub. No.: WO2017/093436
PCT Pub. Date: Jun. 8, 2017

(65) Prior Publication Data
US 2018/0356789 A1    Dec. 13, 2018

(30) Foreign Application Priority Data

Dec. 4, 2015  (DE) ..................... 10 2015 224 337

(51) Int. Cl.
*G11B 15/28* (2006.01)
*G05B 19/404* (2006.01)
(52) U.S. Cl.
CPC .. *G05B 19/404* (2013.01); *G05B 2219/41136* (2013.01)

(58) Field of Classification Search
None
See application file for complete search history.

(56) References Cited

U.S. PATENT DOCUMENTS

| | | | | |
|---|---|---|---|---|
| 3,960,225 A | * | 6/1976 | Hyer ..................... | G01G 11/18 177/121 |
| 4,677,502 A | * | 6/1987 | Browder ............... | G11B 15/46 360/73.04 |
| 4,715,491 A | * | 12/1987 | Elderton ................ | B65G 23/26 198/810.01 |

(Continued)

FOREIGN PATENT DOCUMENTS

DE    10 2010 048 493 A1    5/2011
DE    10 2011 011 915 A1    9/2011
(Continued)

OTHER PUBLICATIONS

International Search Report (PCT/ISA/210) issued in PCT Application No. PCT/EP2016/079499 dated Mar. 1, 2017 with English translation (eight pages).

(Continued)

*Primary Examiner* — Bentsu Ro
(74) *Attorney, Agent, or Firm* — Crowell & Moring LLP

(57) ABSTRACT

An electrical drive system includes a motor, a load device and a coupling unit, wherein a slip is calculated by comparing signals between a motor sensor and a load sensor, and a motor sensor-based position of the load device is cyclically updated, provided that a slip remains below a slip threshold value.

12 Claims, 1 Drawing Sheet

(56) References Cited

U.S. PATENT DOCUMENTS

| | | | | |
|---|---|---|---|---|
| 5,118,092 A | * | 6/1992 | Yamada | G03B 27/6264 |
| | | | | 271/198 |
| 5,335,777 A | * | 8/1994 | Murphy | B65G 43/08 |
| | | | | 198/349.8 |
| 2003/0199349 A1 | * | 10/2003 | Sands | B65G 39/16 |
| | | | | 474/106 |
| 2011/0234146 A1 | | 9/2011 | Iwashita et al. | |
| 2012/0211323 A1 | | 8/2012 | Goeppert | |
| 2014/0062345 A1 | | 3/2014 | Orita | |

FOREIGN PATENT DOCUMENTS

| | | |
|---|---|---|
| DE | 10 2013 217 184 A1 | 5/2014 |
| EP | 0 714 161 A1 | 5/1996 |
| JP | 2006-154289 A | 6/2006 |
| JP | 2007-105809 A | 4/2007 |

OTHER PUBLICATIONS

German-language Written Opinion (PCT/ISA/237) issued in PCT Application No. PCT/EP2016/079499 dated Mar. 1, 2017 (six pages).

\* cited by examiner

ELECTRIC DRIVE SYSTEM

FIELD OF APPLICATION AND PRIOR ART

The invention relates to an electrical drive system comprising a motor, a load device and a coupling unit, wherein the coupling unit is designed to convert a rotational movement of a motor shaft of the motor into a movement of the load device along a path. The coupling unit is subject to slip.

Electrical drive systems of this kind are used, for example, in high bay stores, wherein a load device in the form of a rotor can run through along a path which is situated between bays and inserts pallets or other articles to be stowed into the high bay store or removes them from said high bay store. Lengths of a path of this kind of, for example, several hundred meters can occur in said high bay stores. However, the electrical drive system according to the invention is not restricted to a use of this kind or to specific sizes. For example, it can also be used in conjunction with a conveyor belt which transports articles or bulk goods over a specific distance, in particular along the path.

In order to evaluate speeds and/or positions of the load device, two independent sensors or encoders (dual-sensor system) are often prescribed for risk reduction in respect of functional safety if the required risk reduction for the application is not achieved with a single sensor. This is the case, for example, when the sensor reflects the actual absolute position of the load device or a moving axis, and does not exhibit a safety-related rating or sole safety-related suitability.

In order to obtain sufficiently reliable values for the respective position of the load device, it is known from the prior art to provide a large number of absolute position markers within a movement region of the load device, wherein the absolute positions of sensor channels can be matched with the respective position markers for the purpose of compensating for the application-related slip. In this case, matching is performed solely at the defined position markers, irrespective of the number of position markers.

The number of position markers is typically dependent on the expected slip between the position markers, on the degree of inaccuracy with respect to the absolute value formed from the two sensor signals which is permissible in relation to the application, and on the geometric extent of the path or movement region.

In the case of the rotors or bay operator control devices of high bay stores mentioned in the introductory part which can cover passage lengths of up to 200 m and more, this leads to a very high number of position markers along the path in designs according to the prior art. Said position markers are typically mounted in exact positions depending on the permissible tolerances.

For the purpose of evaluating the position markers using safety-related evaluation units, for example drive-integrated safety engineering or safety control, the position markers are typically parameterized by the user before being commissioned, so that they can be unambiguously identified in the safety-oriented application. In this case, the correct position and parameterization of the position markers is validated as part of the commissioning.

It has been found that the use of position markers leads to a very high level of expenditure overall.

PROBLEM AND SOLUTION

The problem of the invention is therefore to provide an electrical drive system which can be realized with a low level of expenditure without loss of safety.

According to the invention, this is achieved by an electrical drive system having a motor with a motor shaft; a load device which can be moved along a path; a coupling unit which is designed to convert a rotational movement of the motor shaft into a movement of the load device along the path, wherein the coupling unit is subject to slip; a motor sensor for ascertaining a rotation angle position of the motor shaft; a load sensor for ascertaining a load sensor-based position of the load device; and an electronic control apparatus. The electronic control apparatus is connected to the motor sensor and the load sensor. The electronic control apparatus is designed to calculate a motor sensor-based position of the load device based on a change in the rotation angle position of the motor shaft, which change is ascertained by the motor sensor and is designed, after each change in the rotation angle position of the motor shaft by a reference value, to calculate a slip based on a difference between the motor sensor-based position and the load sensor-based position, and to set the motor sensor-based position to the load sensor-based position when the slip is smaller than a slip threshold value, and to assume a fault state when the slip is greater than the slip threshold value.

The invention relates to an electrical drive system.

The electrical drive system has a motor with a motor shaft (output shaft). The motor is designed, for example, as an electric motor and serves for driving purposes.

The electrical drive system has a load device which can be moved along a path. This load device is typically that element which moves a useful load or another article. By way of example, said load device can be a rotor of a high bay store. However, it can also be, for example, a conveyor belt or another unit.

The electrical drive system has a coupling unit which is designed to convert a rotational movement of the motor shaft into a movement of the load device along the path, wherein the coupling unit is subject to slip. A coupling unit of this kind may be, for example, a friction wheel or a belt. The term "a slip" is intended to be understood to mean, in particular, a deviation between a rotation of the motor shaft about a specific angle and a movement of the load device which corresponds purely mathematically to said rotation. A slip of this kind can occur, in particular, when components such as, for example, a tooth-free belt or a friction wheel which are dependent on friction for the purpose of the transmission of force and, in particular, are not in interlocking connection with a drive and/or output element are present. Otherwise, reference may also be made to the relevant technical literature in respect of the term slip.

The electrical drive system has a motor sensor for ascertaining a rotation angle position of the motor shaft. Said motor sensor typically outputs the respective rotation angle position of the motor or of the motor shaft in an electrically or electronically processable form. The motor sensor may be, for example, a resolver etc.

The electrical drive system further has a load sensor for ascertaining a load sensor-based position of the load device. Said load sensor typically outputs the position of the load device in an electrically or electronically processable form.

The electrical drive system further has an electronic control apparatus. The electronic control apparatus is connected to, that is to say forms a signal-transmitting connection with, the motor sensor and the load sensor.

The electronic control apparatus is designed to calculate a motor sensor-based position of the load device based on a change in the rotation angle position of the motor shaft, which change is ascertained by the motor sensor. Furthermore, the electronic control apparatus is designed, after each change in the rotation angle position of the motor shaft by a prespecifiable reference value or after changes in the position, which is detected by means of the motor sensor, by a prespecifiable reference value, to carry out a difference calculation (slip calculation) between the motor sensor-based position and the load sensor-based position, that is to say to calculate a slip based on a difference between the motor sensor-based position and the load sensor-based position, and to set the motor sensor-based position to the load sensor-based position when the slip is smaller than a first prespecifiable slip threshold value, and to assume a fault state when the slip is greater than a second prespecifiable slip threshold value. The first slip threshold value and the second slip threshold value can be identical or differ in order to form a hysteresis. The (first, second) slip threshold value can be, for example, 10%, 5%, 2.5%, 2% or 1% (for example calculated as a magnitude of a difference between the motor sensor-based position and the load sensor-based position with respect to the motor sensor-based position).

In this case, the motor sensor-based position is based, in particular, on the changed rotation angle position of the motor shaft. The load sensor-based position is typically based on output data from the load sensor. In particular, respective differences from previous values, for example from respective sampling times, can be taken into consideration. When a fault state is assumed, the system can be, in particular, stopped in order to avoid damage or malfunctioning.

The electrical drive system according to the invention can be used to calculate the position of the load device along the path not only based on the possibly faulty and non-safety-classified load sensor, but also based on the more reliable motor sensor. This allows the use of the reliable motor sensor for redundant calculation of the position of the load device. The redundant determination of the position of the load device by means of the motor sensor is performed only for as long as the slip remains below the slip threshold value. Therefore, it is possible to ensure that the two sensors remain compatible with one another, as a result of which the availability and the accuracy of the dual-channel sensor evaluation can be ensured. It goes without saying that the motor sensor can also be of non-safe design. In this case, a safe function can again be produced with interaction of two non-safe components.

According to one embodiment, the reference value corresponds to a complete revolution of the motor or the motor shaft. This corresponds to a simple and practical design. A complete revolution can mean, in particular, an angle of 360°. However, a reference value of several complete revolutions, for example two, three or four or even more complete revolutions, can also be used. A fraction of a complete revolution, for example 180° or 90°, can also be used.

The motor sensor-based position can be calculated, in particular, by means of a model of the coupling unit. A model of this kind can take into account, for example, transmission ratios and other mechanical characteristics of the coupling unit. A specific distance along the path can be associated, for example, with a complete revolution of the motor or the motor shaft.

The concept behind the electrical drive system according to the invention is based, in principle, on continuous, cyclical compensation which is derived from a fixed, defined relative movement, for example a 360° motor movement, of the motor sensor. In this case, the permissible slip which is parameterized for this relative movement is monitored by the electronic control apparatus which can, for example, also be called a safety system. If the detected slip with respect to the relative movement lies within the expected parameterized limits, in particular below the slip threshold value, the slip is compensated, after the relative movement is achieved, by the absolute value of the load sensor being transmitted to the absolute value channel of the motor sensor. Therefore, the cyclical slip compensation does not require any physical position markers.

The following faults
slip of the motor sensor,
jumps in position of the load sensor,
bit errors of the load sensor,
measurement errors of the load sensor, including any interference by obstacles
which are to be taken into consideration from a safety point of view are controlled or identified, in particular in spite of the slip compensation, by means of this procedure.

Therefore, the most frequent and most important errors that occur can be reliably identified by means of the electrical drive system according to the invention. Only long-term drift errors of the load sensor are not identified using the slip compensation described here.

According to one development, a maximum number of (for example at most two) diagnosis markers are arranged at defined, in particular fixed, diagnosis marker positions along the path. In this case, the diagnosis marker position is typically defined and known. A diagnosis marker can also be called a position marker. In this case, the electronic control apparatus is designed to identify crossing of the diagnosis marker by the load device, for example by means of a scanning device or sensor, and, when the diagnosis marker is crossed, to compare the diagnosis marker position with the load sensor-based position in order to detect possible drift errors in the load sensor and/or errors in conjunction with the diagnosis marker (for example soiling of the diagnosis marker).

The control apparatus can further be designed to monitor whether the diagnosis marker can be detected or can be identified at the diagnosis marker position and to assume the fault state when the diagnosis marker cannot be detected at the diagnosis marker position, for example because the diagnosis marker is soiled or defective.

Owing to the use of an additional diagnosis marker, drift errors, in particular long-term drift errors, of the load sensor can also be detected and accordingly compensated or the system can be stopped. In particular, the fault state can be assumed in the event of a deviation in the diagnosis marker position and the load sensor-based position which is greater than a prespecified threshold value. Therefore, errors or damage on account of a drift error in the load sensor can be reliably avoided. It should be noted that, in contrast to the design according to the prior art, only one single diagnosis marker is required in order to identify drift errors of this kind in the load sensor. The use of a large number of diagnosis markers, as is customary according to the prior art, can be dispensed with, this making a considerable contribution to the reduction in expenditure.

The electronic control apparatus is preferably designed to actuate the motor in such a way that the load device cyclically crosses the diagnosis marker. This ensures regular monitoring for drift errors. By way of example, the electronic control apparatus can be designed to actuate the motor in such a way that the load device crosses the diagnosis marker after a predetermined time or after a predetermined travel distance.

The diagnosis marker can be arranged, in particular, at a point along the path at which a maximum movement speed of the load device is permissible. This has been found to be advantageous.

The electronic control apparatus can further be designed to calculate an amount of wear, which is associated with the coupling unit, based on the slip. By way of example, the higher the slip, the higher the amount of wear can be ascertained to be. Therefore, for example, a user can be notified when components, in particular the coupling unit, are to be replaced or safe operation is no longer ensured.

The motor can be, in particular, an electric motor. However, said motor can also be, for example, an internal combustion engine, a hydraulic motor, a thermodynamic motor or another type of motor.

The load unit can be, in particular, a rotor of a high bay arrangement, a rotary table or a conveyor belt. The electrical drive system has been found to be particularly advantageous for applications of this kind.

The electronic control apparatus can advantageously be designed to be operated in systems of functional safety. In particular, the safety, which is achieved by a large number of diagnosis markers in designs according to the prior art, can therefore be achieved by relatively simple calculations.

When the electrical drive system is used in applications with safety functions which require safety-related monitoring of the absolute position, it is generally expedient to initially carry out a reference run for which a position switch and at least one position marker or diagnosis marker are used. The reason for this requirement is that a link between the absolute position or an absolute position value and an internal measurement system is first established by means of the reference run. A reference event can then be used to identify whether the diagnosis marker is at that position at which it is expected and whether this absolute position value also coincides with the absolute value sensor position.

The load sensor is, in particular, a sensor which has any desired non-safety-rated interface of a machine part and which, owing to mechanical properties, can have a position in relation to the first sensor which is subject to slip, in particular the motor sensor, which differs for operating reasons.

This effect is of significance, for example, in drives which are equipped with a friction wheel. Owing to alternating braking and accelerating processes, a slip which tends to increase can accumulate depending on slip occurring between the motor sensor and load sensor. Since the safety-related diagnosis is based on the comparability of the two sensor channels, the described effect would lead, possibly in the short term, to a problem in terms of availability.

In the design described herein, the slip is compensated for taking into account all of the relevant safety-related aspects. A typical prerequisite is that the maximum slip to be compensated or maximum permitted slip, which can occur on a defined, parameterizable path, is known. The slip compensation typically causes, taking into account safety-related aspects, comparison of the positions of the two sensor channels in a dual-channel system of a safety-critical application, wherein comparison can take place repeatedly as soon as a prespecified path has been covered in each case.

In comparison to designs according to the prior art, it is possible, in particular, for considerably fewer diagnosis markers or position markers to be used, as mentioned. A clearly more expedient design is possible in comparison to other designs which are based on avoiding the slip, for example owing to the use of toothed belt drives or gear wheels. Furthermore, the parameterization of the system is highly simplified, the assembly and commissioning times are significantly shortened, the expenditure on servicing is reduced and the availability of the system is increased, since position markers which are used otherwise can lead to failure of the system, for example if said position markers are soiled or damaged.

BRIEF DESCRIPTION OF THE DRAWINGS

The invention will be described in detail below with reference to the drawings, in which.

DETAILED DESCRIPTION OF THE EXEMPLARY EMBODIMENTS

Figure 1:
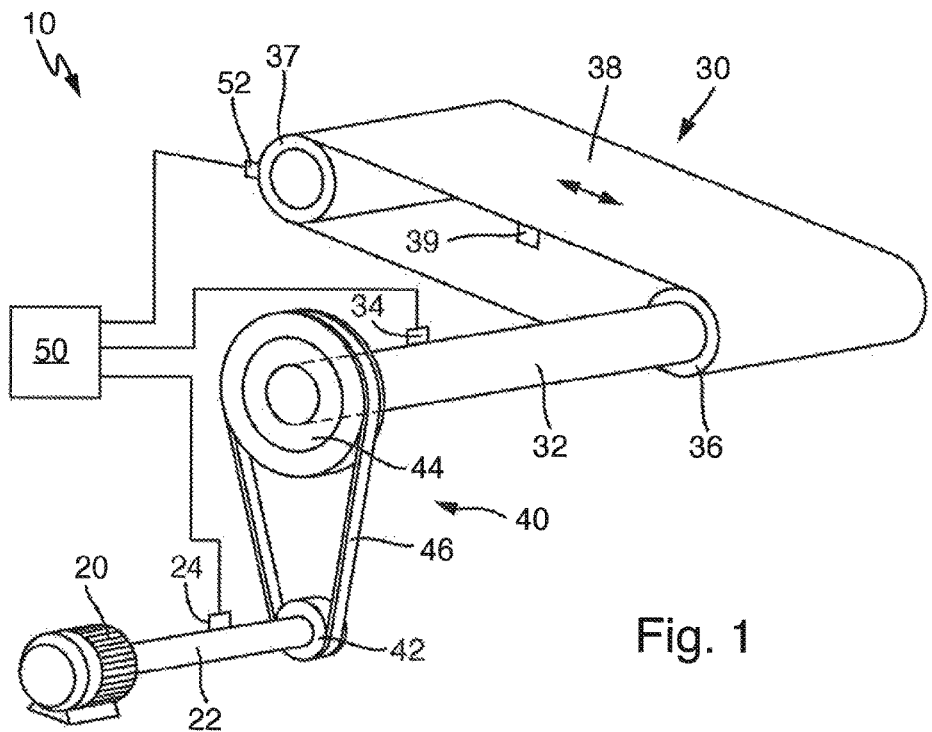
FIG. 1: shows an electrical drive system.

FIG. 1 schematically shows an electric drive system 10 according to an exemplary embodiment of the invention. The electrical drive system 10 has a motor 20 in the form of an electric motor. The motor 20 has a first (motor) shaft 22 or is connected in a rotationally fixed manner to the shaft 22. A motor sensor 24 is arranged on the first shaft 22.

The electrical drive system has a load device 30 in the form of a conveyor belt arrangement. The load device 30 has a second shaft 32 on which a load sensor 34 is arranged. A first drive roller 36, which is driven by the second shaft 32, is arranged on the second shaft 32. A second drive roller 37 is arranged parallel to said first drive roller. A conveyor belt 38, which is moved when the second shaft 32 rotates, is stretched between the two drive rollers 36, 37.

A reference element 39, which is fixed at a specific point of the conveyor belt 38, is arranged on the conveyor belt 38. The significance of said reference element is discussed in more detail further below.

A coupling unit 40 is arranged between the motor 20 and the load device 30. The coupling unit 40 has a first wheel 42, a second wheel 44, and a belt 46 which is stretched between said wheels. The first wheel 42 is mounted on the first shaft 22. The second wheel 44 is mounted on the second shaft 32. The belt 46 is stretched between the two wheels 42, 44 in such a way that a rotational movement of the first wheel 42 is transmitted to the second wheel 44.

Since the belt 46 is a flat belt which, in particular, does not have any teeth or other structuring, and also the two wheels 42, 44 have a respective flat surface, the transmission of the rotational movement of the motor 20 to the load device 30 is subject to slip. This means that, although a specific transmission ratio is prespecified by the ratio of the diameters of the two wheels 42, 44 in principle, said transmission ratio indicating the rotation speed of the second shaft 32 relative to the first shaft 22, this relationship is subject to a degree of unreliability, since the transmission of the rotational movement ultimately depends on the friction between the two wheels 42, 44 and the belt 46.

The motor sensor 24 is designed to measure a rotation angle position of the first shaft 22. The load sensor 34 is designed to measure a rotation angle position of the second shaft 32. In this case, the motor sensor 24 is safety-rated, that is to say it has a particularly high degree of trustworthiness. In contrast, the load sensor 34 is not safety-rated and accordingly has only a limited degree of trustworthiness. Therefore, control of the position of the conveyor belt 38 is not permissible solely based on the load sensor 34.

The electrical drive system 10 further has an electronic control apparatus 50. As shown, the electronic control apparatus 50 forms a signal-transmitting connection with the motor sensor 24 and the load sensor 34 (the signal-transmitting connection can be wired or wire-free), so that the electronic control apparatus 50 receives the respective rotation angle positions.

Furthermore, the electrical drive system 10 has a switch 52 as a diagnosis marker, which switch is likewise connected to the electronic control apparatus 50. The switch 52 is arranged directly adjacent to the conveyor belt 38 and is designed to detect when the reference element 39 passes the corresponding point of the switch 52.

In order to calculate an accurate, that is to say motor sensor-based, position of the load device 30, the electronic control apparatus 50 continuously evaluates the signals from the motor sensor 24 and the load sensor 34. In this case, the motor sensor-based position of the load device is calculated based on a change in the rotation angle position of the first shaft 22, which change is ascertained by the motor sensor 24. In principle, the characteristics of the coupling unit 40 already mentioned further above can be used for this purpose. After each change in the rotation angle position of the first shaft 22 through 360°, the electronic control apparatus 50 calculates a slip based on a difference between the rotation angle position of the second shaft 32 and the first shaft 22. Said slip can be measured, in particular, in a deviation between the expected rotation angle position or change in the rotation angle position of the second shaft 32 from the actually measured rotation angle position or change in the rotation angle position of the second shaft 32.

If the calculated slip lies below a slip threshold value, the motor sensor-based position is set to the load sensor-based position, that is to say to the position which has been directly measured using the load sensor 34. This is based on the consideration that the load sensor 34 appears to be trustworthy in the case of a very small slip. If, however, the slip is above the slip threshold value, a fault state is assumed, this meaning, in particular, that the motor 20 is stopped and the system is therefore brought to a standstill.

It should be noted in this connection that a position of the conveyor belt 38, which can be expressed in a position of the reference element 39 for example, can be inferred in particular by means of the known diameter of the first drive roller 36 taking into account the rotation angle position of the second shaft 32.

Each time the reference element 39 passes the switch 52, the electronic control apparatus 50 checks whether the rotation angle position of the second shaft 32, which rotation angle position is indicated by the load sensor 34, corresponds to said position of the conveyor belt 38. Therefore, drift errors in the load sensor 34 can be identified, in particular drift errors which occur over a relatively long period of time. If a deviation which is ascertained in the process is too large, the system is likewise stopped and an instruction to check the load sensor 34 is output.

Figure 2:
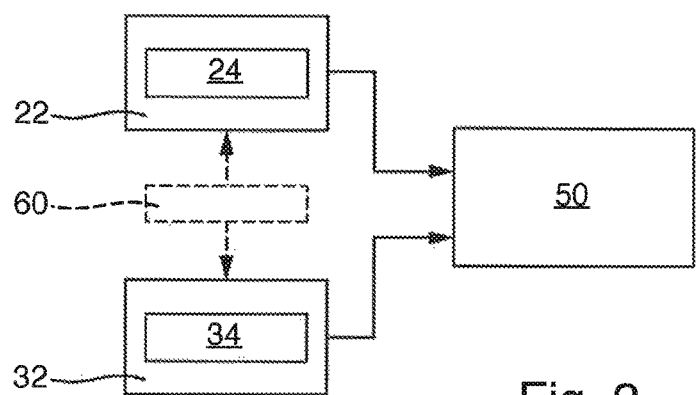
FIG. 2: shows a schematic illustration of the calculation of a motor sensor-based position.

FIG. 2 schematically shows how the electronic control apparatus 50 arrives at a safe absolute position in the form of a motor sensor-based position. The two shafts 22, 32 comprising the motor sensor 24 and, respectively, comprising the load sensor 34 are shown here. As already mentioned a slip, which is schematically illustrated by reference sign 60, prevails between the two shafts 22, 32. A deviation between the expected changes in the rotation angle positions can occur on account of this slip. If this deviation is small enough, a safe absolute position can be continuously cyclically calculated. If the slip is too large, a fault state is assumed and therefore possible harmful malfunctioning of the system is prevented.

According to the invention, the non-safety-rated sensor can be trusted. Dual-channel sensor evaluation is permanently possible, since validation of the trustworthiness takes place in defined steps. The measured deviation must not lie above the expected slip.

What is claimed is:

1. An electrical drive system, comprising:
a motor with a motor shaft,
a load device which is movable along a path;
a coupling unit which is configured to convert a rotational movement of the motor shaft into a movement of the load device along the path, wherein the coupling unit is subject to slip;
a motor sensor for ascertaining a rotation angle position of the motor shaft;
a load sensor for ascertaining a load sensor-based position of the load device; and
an electronic control apparatus connected to the motor sensor and the load sensor, the electronic control apparatus being configured to:
calculate a motor sensor-based position of the load device based on a change in the rotation angle position of the motor shaft, which change is ascertained by the motor sensor,
after each change in the rotation angle position of the motor shaft by a reference value, (i) calculate a slip based on a difference between the motor sensor-based position and the load sensor-based position, and (ii) set the motor sensor-based position to the load sensor-based position when the slip is smaller than a slip threshold value, and assume a fault state when the slip is greater than the slip threshold value.

2. The electrical drive system as claimed in claim 1, wherein
the reference value corresponds to a complete revolution of the motor shaft.

3. The electrical drive system as claimed in claim 2, wherein
the motor sensor-based position is calculated via a model of the coupling unit.

4. The electrical drive system as claimed in claim 1, wherein
the motor sensor-based position is calculated via a model of the coupling unit.

5. The electrical drive system as claimed in claim 1, wherein
at least one diagnosis marker is arranged at a diagnosis marker position along the path, wherein the electronic control apparatus is further configured to:
identify crossing of the diagnosis marker by the load device and, when the diagnosis marker is crossed, compare the diagnosis marker position with the load sensor-based position in order to detect possible drift errors in the load sensor, and/or
monitor whether the diagnosis marker is detectable at the diagnosis marker position and assume the fault state when the diagnosis marker cannot be detected at the diagnosis marker position.

6. The electrical drive system as claimed in claim 5, wherein the electronic control apparatus is further configured to:
actuate the motor in such a way that the load device cyclically crosses the diagnosis marker.

7. The electrical drive system as claimed in claim 6, wherein
the diagnosis marker is arranged at a point along the path at which a maximum movement speed of the load device is permissible.

8. The electrical drive system as claimed in claim 5, wherein
   the diagnosis marker is arranged at a point along the path at which a maximum movement speed of the load device is permissible.

9. The electrical drive system as claimed in claim 1, wherein the electronic control apparatus is further configured to:
   calculate an amount of wear, which is associated with the coupling unit, based on the slip.

10. The electrical drive system as claimed in claim 1, wherein
    the motor is an electric motor.

11. The electrical drive system as claimed in claim 1, wherein
    the load device is a rotor of a high bay arrangement, a rotary table and/or a conveyor belt.

12. The electrical drive system as claimed in claim 1, wherein the electronic control apparatus is configured to be operated in systems of functional safety.

* * * * *